(12) United States Patent
Chunn

(10) Patent No.: US 11,231,064 B2
(45) Date of Patent: Jan. 25, 2022

(54) RETAINER NUT LOCKING APPARATUS AND METHODS

(71) Applicant: FORUM US, INC., Houston, TX (US)

(72) Inventor: Austin Chunn, Fort Worth, TX (US)

(73) Assignee: FORUM US, INC., Houston, TX (US)

( * ) Notice: Subject to any disclaimer, the term of this patent is extended or adjusted under 35 U.S.C. 154(b) by 165 days.

(21) Appl. No.: 16/575,481

(22) Filed: Sep. 19, 2019

(65) Prior Publication Data

US 2021/0088167 A1   Mar. 25, 2021

(51) Int. Cl.
| F16B 39/02 | (2006.01) |
| F16L 55/11 | (2006.01) |
| F16L 55/115 | (2006.01) |
| F04B 49/10 | (2006.01) |
| F04B 53/16 | (2006.01) |

(52) U.S. Cl.
CPC .......... F16B 39/02 (2013.01); F16L 55/1108 (2013.01); *F04B 49/10* (2013.01); *F04B 53/16* (2013.01); *F16L 55/1155* (2013.01)

(58) Field of Classification Search
CPC ..... F16L 55/11; F16L 55/1108; F16L 55/1125
USPC ............ 285/88; 292/257; 411/985, 986, 998
See application file for complete search history.

(56) References Cited

U.S. PATENT DOCUMENTS

| 203,169 | A | * | 4/1878 | Lunger | F16B 39/32 |
| | | | | | 411/296 |
| 579,547 | A | * | 3/1897 | Perry | F16B 39/32 |
| | | | | | 411/326 |
| 827,629 | A | * | 7/1906 | Griffin | F16B 39/32 |
| | | | | | 411/326 |
| 1,544,951 | A | * | 7/1925 | Sollee | B60K 15/0409 |
| | | | | | 70/168 |
| 1,749,287 | A | * | 3/1930 | Jackson | F16L 55/1108 |
| | | | | | 220/288 |

(Continued)

FOREIGN PATENT DOCUMENTS

| DE | 1703966 A1 | 2/1972 |
| DE | 3525947 C1 * | 1/1987 | ............. F16B 39/20 |

OTHER PUBLICATIONS

"Heavy Duty Cam Handles", McMaster-Carr, www.mcmaster.com/cam-handles, last visited date Jul. 16, 2019.

(Continued)

*Primary Examiner* — Robert K Arundale
*Assistant Examiner* — Richard K. Durden
(74) *Attorney, Agent, or Firm* — Patterson + Sheridan, L.L.P.

(57) ABSTRACT

Aspects of the present disclosure relate to retainer nut locking apparatus and methods for fluid ends, and associated components thereof. In one implementation, a method of operating a fluid end includes installing a retainer nut assembly on a fluid end body by turning a retainer nut in an installation direction and into a bore formed in the fluid end body. The retainer nut has a first surface that faces away from the fluid end body and a second surface that faces that fluid end body. The method also includes rotating a locking tab in a locking direction and into contact with an inner surface of the fluid end body. The locking direction is opposite of the installation direction. The locking tab is disposed inside the bore and adjacent to the second surface of the retainer nut.

20 Claims, 10 Drawing Sheets

(56) References Cited

U.S. PATENT DOCUMENTS

| | | | | |
|---|---|---|---|---|
| 1,936,440 | A | * | 11/1933 | Soucie .................... F16B 39/32 |
| | | | | 411/327 |
| 2,022,267 | A | * | 11/1935 | Zeek ........................ E21B 43/00 |
| | | | | 220/210 |
| 2,574,648 | A | | 11/1951 | Mason |
| 2,624,609 | A | * | 1/1953 | Storm ..................... E21B 19/00 |
| | | | | 294/86.4 |
| 2,744,777 | A | | 5/1956 | Mucher |
| 3,402,958 | A | * | 9/1968 | Barry ...................... E05C 3/042 |
| | | | | 292/62 |
| 3,797,286 | A | * | 3/1974 | Saporito ................. F16K 35/10 |
| | | | | 70/169 |
| 4,395,062 | A | * | 7/1983 | F'Geppert ............. E05B 65/006 |
| | | | | 24/DIG. 53 |
| 4,520,837 | A | | 6/1985 | Cole et al. |
| 4,688,835 | A | * | 8/1987 | Wu .......................... E05B 83/01 |
| | | | | 292/59 |
| 4,784,087 | A | * | 11/1988 | Chevalier ........... B29C 44/1242 |
| | | | | 122/19.2 |
| 5,127,807 | A | | 7/1992 | Eslinger |
| 5,419,538 | A | | 5/1995 | Nicholas et al. |
| 5,737,950 | A | * | 4/1998 | Yun-Bin ................. E05B 17/04 |
| | | | | 70/374 |
| 6,171,070 | B1 | | 1/2001 | Mitake |
| 7,150,596 | B2 | * | 12/2006 | Diaz ......................... F16B 5/02 |
| | | | | 411/344 |
| 7,350,832 | B1 | | 4/2008 | Kiely |
| 8,402,880 | B2 | | 3/2013 | Patel et al. |
| 8,529,230 | B1 | | 9/2013 | Colley, III et al. |
| 8,701,546 | B2 | | 4/2014 | Pacht |
| 9,157,468 | B2 | | 10/2015 | Dille et al. |
| 9,188,121 | B1 | * | 11/2015 | Dille ..................... F04B 53/007 |
| 2005/0201881 | A1 | | 9/2005 | Jensen et al. |
| 2006/0042708 | A1 | * | 3/2006 | Stowe ..................... F16L 35/00 |
| | | | | 138/89 |
| 2008/0116688 | A1 | | 5/2008 | Bull et al. |
| 2010/0143163 | A1 | | 6/2010 | Patel et al. |
| 2011/0142699 | A1 | | 6/2011 | Pacht |
| 2011/0303674 | A1 | * | 12/2011 | Tockey .................. B65D 25/20 |
| | | | | 220/476 |
| 2012/0164004 | A1 | | 6/2012 | Thomeer et al. |
| 2013/0068092 | A1 | | 3/2013 | Marette |
| 2016/0108910 | A1 | | 4/2016 | Smith |
| 2017/0218993 | A1 | | 8/2017 | Freed et al. |
| 2019/0264683 | A1 | * | 8/2019 | Smith ................... F04B 53/007 |
| 2021/0071452 | A1 | * | 3/2021 | Tomao ...................... E05C 5/04 |

OTHER PUBLICATIONS

Nowell, Mark, "The 5 Failures of Fluid Ends", Upstream Pumping, Oct. 18, 2016, pp. 1-8, last visited date Aug. 20, 2019.

International Search Report and Written Opinion for Application No. PCT/US2016/066598 dated Jun. 30, 2017.

International Search Report and Written Opinion for Application No. PCT/US2016/066616 dated Mar. 15, 2017.

* cited by examiner

RETAINER NUT LOCKING APPARATUS AND METHODS

BACKGROUND

Field

The disclosure relates to retainer nut locking apparatus and methods for fluid ends, and associated components thereof.

Description of the Related Art

Retainer nuts are used in the oil and gas industry, such as on fluid ends. Operational problems can arise when the retainer nuts back out during use. For example, backing out of a retainer nut can cause premature failure of a fluid end by causing cracking in the fluid end. The probability or extent of such a failure can cause changes to be made to the fluid end that increase cost and complexity of the fluid end, and/or decrease reliability, ease of use, and/or modularity of the fluid end.

Therefore, there is a need for a retainer nut that reduces or eliminates the risk and/or amount of backing out during use, and promotes reliability, cost-effectiveness, design simplicity, ease of use, and modularity of fluid ends.

SUMMARY

Implementations of the present disclosure relate to retainer nut locking apparatus and methods for fluid ends, and associated components thereof.

In one implementation, a retainer nut assembly for fluid ends includes a retainer nut. The retainer nut includes a first surface at a first end of the retainer nut, a second surface at a second end of the retainer nut, and a recess formed in the second surface that defines a recessed surface. The retainer nut also includes a first opening extending from the first surface to the recessed surface, and a second opening formed in the recessed surface. The retainer nut also includes a threaded outer surface disposed between the first surface and the second surface. The retainer nut assembly also includes a locking assembly. The locking assembly includes a locking tab and a stop disposed at least partially in the second opening and protruding from the recessed surface. The locking assembly also includes an actuator disposed at least partially in the first opening that is configured to rotate the locking tab between an unlocked position and a locked position.

In one implementation, a method of operating a fluid end includes installing a retainer nut assembly on a fluid end body by turning a retainer nut in an installation direction and into a bore formed in the fluid end body. The retainer nut has a first surface that faces away from the fluid end body and a second surface that faces that fluid end body. The method also includes rotating a locking tab in a locking direction and into contact with an inner surface of the fluid end body. The locking direction is opposite of the installation direction. The locking tab is disposed inside the bore and adjacent to the second surface of the retainer nut.

In one implementation, a fluid end includes a fluid end body, a plunger disposed at least partially in the fluid end body, and a bore defining an inner surface of the fluid end body. The inner surface includes a threaded portion and a thread relief disposed inward of the threaded portion. A retainer nut assembly includes a retainer nut disposed at least partially in the bore. The retainer nut includes a threaded outer surface that interfaces with the threaded portion of the inner surface of the fluid end body. The retainer nut assembly also includes a locking assembly. The locking assembly includes a locking tab that is rotatable between an unlocked position and a locked position. In the locked position, the locking tab contacts the inner surface of the fluid end body at a location inwards of or at the thread relief.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
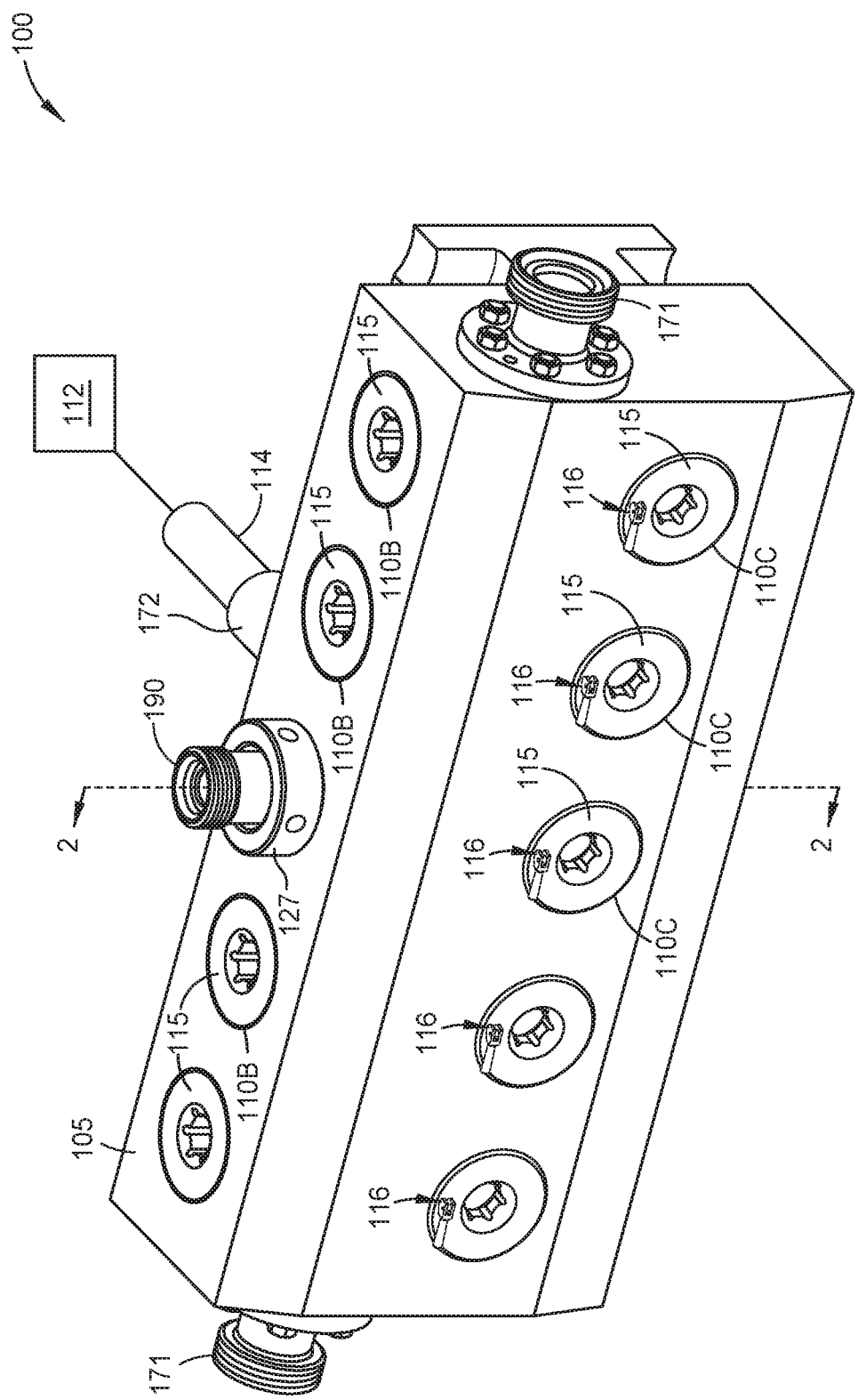
FIG. 1 is a schematic isometric view of a fluid end having a fluid end body, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to retainer nut locking apparatus and methods for fluid ends, and associated components thereof.

Figure 2A:
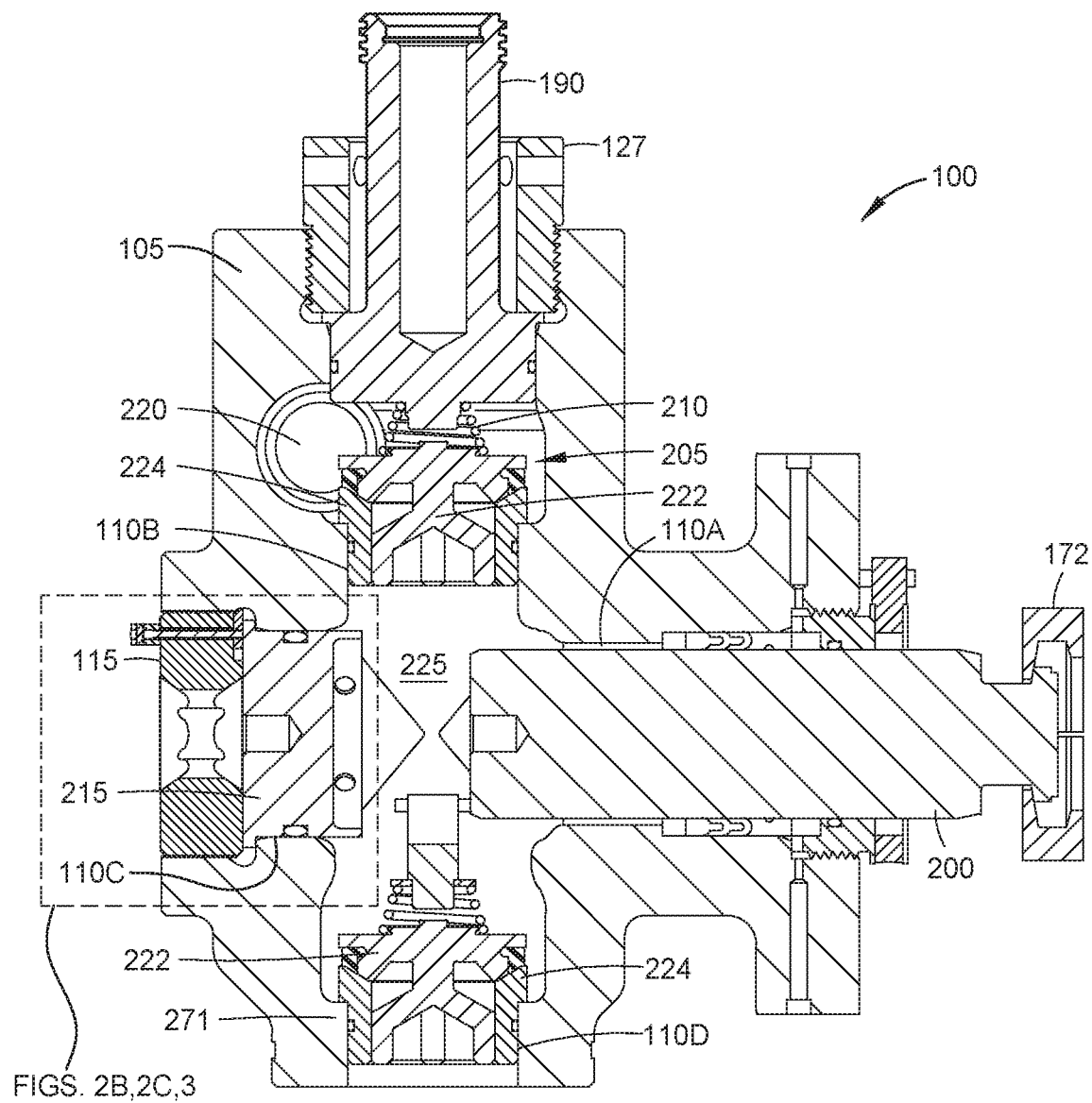
FIG. 2A is a schematic cross-sectional view of the fluid end illustrated in FIG. 1 along lines 2-2, according to one implementation.

FIG. 1 is a schematic isometric view of a fluid end 100 having a fluid end body 105, according to one implementation. FIG. 2A is a schematic cross-sectional view of the fluid end 100 illustrated in FIG. 1 along lines 2-2, according to one implementation. The fluid end 100 includes a plurality of bores 110A-110D (110A and 110D are shown FIG. 2A) formed in the fluid end body 105. The fluid end 100 is adapted to couple to a power end 112 via a pony rod 114.

While only one pony rod 114 is shown, the power end 112 may have a pony rod that couples to each of the bores 110A of the fluid end 100.

The fluid end 100 includes retainer nut assemblies 116, each having a retainer nut 115 disposed at least partially in one of the bores 110C. The fluid end 100 also includes a retainer nut 115 disposed in each of the bores 110B. Each of the bores 110B may include a retainer nut assembly 116 disposed at least partially therein that includes one or more of the same features, aspects, components, and/or properties as the retainer nut assemblies 116 disposed at least partially in the bores 110C.

A gauge connector 190 may be coupled to one of the bores 110B by a gauge connector nut 127. A discharge flange 171 may be coupled to opposing ends of the fluid end body 105 for connecting hoses with a discharge manifold. A plunger clamp 172 may be disposed between the fluid end 100 and the pony rod 114.

Referring to FIG. 2A, the internal components of the fluid end 100 will be described. A plunger 200 is shown disposed in the bore 110A, and a valve assembly 205 having a spring 210 is shown disposed in the bore 110B. A suction cover 215 is shown disposed in the bore 110C, and a valve stop 271 is shown in the bore 110D. The suction cover 215 is disposed inwards of the retainer nut 115 relative to the fluid end body 105. A valve body 222 as well as a valve seat 224 may also be disposed in the bores 110B and 110D. The fluid end body 105 may also include a discharge manifold 220 formed therein that is in selective communication with at least the bore 110B. The bores 110A-110D formed in the fluid end body 105 intersect within the fluid end body 105 at a junction 225.

Figure 2B:
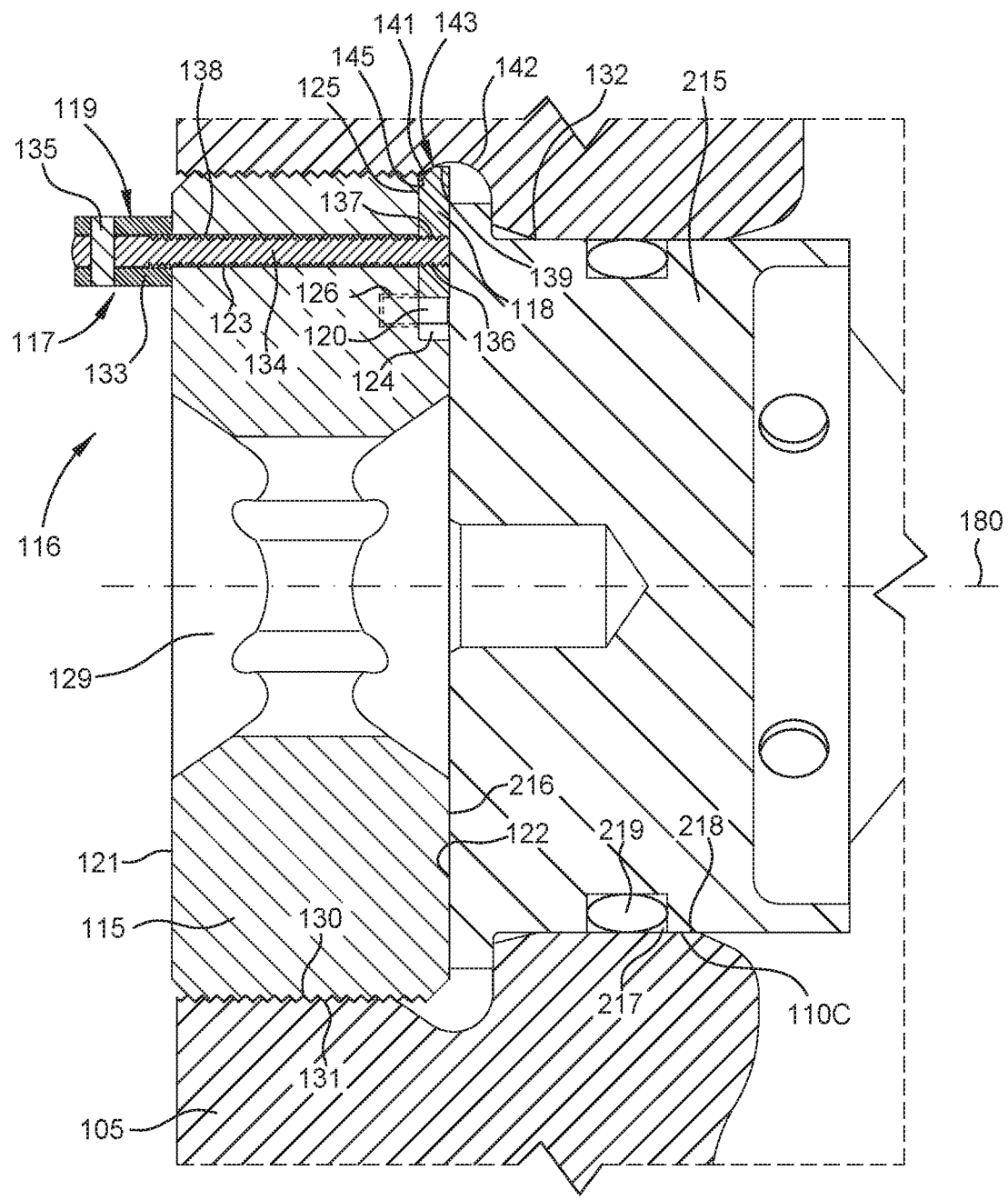
FIG. 2B is a schematic enlarged cross sectional view of a portion of the fluid end illustrated in FIGS. 1 and 2A, according to one implementation.

FIG. 2B is a schematic enlarged cross sectional view of a portion of the fluid end 100 illustrated in FIGS. 1 and 2A, according to one implementation. The retainer nut assembly 116 includes the retainer nut 115 and a locking assembly 117. The locking assembly 117 includes a locking tab 118, an actuator 119, and a stop 120. The retainer nut 115 includes a first surface 121 at a first end of the retainer nut 115 and a second surface 122 at a second end of the retainer nut 115. The second surface 122 is disposed inwardly of the first surface 121 with respect to the fluid end body 105. The first surface 121 faces away from the fluid end body 105 and the second surface 122 faces the fluid end body 105. The locking tab 118 is disposed inside of the bore 110C and adjacent to the second surface 122 of the retainer nut 115. The locking tab 118 is closer to the second surface 122 than the first surface 121.

The retainer nut 115 is installed in the bore 110C of the fluid end body 105 such that the second surface 122 contacts a first surface 216 of the suction cover 215. For example, the retainer nut 115 is threaded into the bore 110C until the second surface 122 contacts the first surface 216 of the suction cover 215. The suction cover 215 includes a recess 217 formed in an outer surface 218 of the suction cover 215. A seal 219 is disposed in the recess 217 of the suction cover 215. The retainer nut 115 is threaded into the bore 110C of the fluid end body 105. The retainer nut 115 includes an inner tool interface 129 and a threaded outer surface 130. The inner tool interface 129 is sized and shaped to be removed by a tool, such as a wrench or a hex tool, for example when the tool turns the retainer nut 115 in a removal direction. The threaded outer surface 130 interfaces with, and is threaded into, a threaded portion 131 of an inner surface 132 of the fluid end body 105. The inner surface 132 is defined at least partially by the bore 110C.

The retainer nut 115 includes a recess 124 formed in the second surface 122, defining a recessed surface 125. The retainer nut 115 includes a first opening 123 that extends from the first surface 121 to the recessed surface 125 of the retainer nut 115. A second opening 126 is formed in the recessed surface 125. The stop 120 of the locking assembly 117 is disposed at least partially in the second opening 126 such that the stop 120 protrudes inwardly relative to the fluid end body 105 and past the recessed surface 125 and into the recess 124. The stop 120 is a dowel pin.

The actuator 119 includes a cam handle 133 that is connected to the locking tab 118 through a connector rod 134. The connector rod 134 is disposed at least partially in the first opening 123. The connector rod 134 connects to the cam handle 133 at a first end and connects to the locking tab 118 at a second end. The connector rod 134 connects to the cam handle 133 with a pin 135 disposed through the connector rod 134. The connector rod 134 connects to the locking tab 118 using a threaded connection 136. The threaded connection 136 is formed by a threaded portion of a central opening 137 of the locking tab 118 and a threaded outer surface 138 of the connector rod 134. Turning the cam handle 133 facilitates turning the connector rod 134. Turning the connector rod 134 facilitates turning the locking tab 118 to rotate the locking tab 118 between an unlocked position and a locked position.

FIG. 2B illustrates the locking tab 118 in the locked position. The inner surface 132 of the fluid end body 105 includes the threaded portion 131 and a thread relief 141 disposed inwardly of the threaded portion 131 relative to the fluid end body 105. A groove 142 is formed in the inner surface 132. In the locked position, the locking tab 118 contacts the inner surface 132 of the fluid end body 105. A first curved outer surface 139 of the locking tab 118 contacts the inner surface 132 at a location 143 that is inward of, or at, the thread relief 141 of the inner surface 132. In one example, the thread relief 141 begins where the threads of the threaded portion 131 end. In one example, the thread relief 141 forms part of the groove 142. In one example, the thread relief 141 includes any non-threaded and/or recessed portion of the inner surface 132 of the bore 110C.

The locking tab 118 includes a chamfer 145 disposed adjacent to the first curved outer surface 139. In one embodiment, which can be combined with other embodiments, the first curved outer surface 139 of the locking tab 118 contacts the inner surface 132 at the location 143 that is radially outside of the threaded portion 131 of the inner surface 132 relative to a central axis 180 of the bore 110C. In one example, the location 143 is farther from the central axis 180 than the threaded portion 131.

The locked position of the locking tab 118 facilitates reducing or eliminating the probability of premature failure of the fluid end 100. The locked position of the locking tab 118 facilitates reducing or eliminating the probability that the retainer nut 115 will back out of the fluid end body 105 because of at least the contact between the locking tab 118 and the inner surface 132 at the location 143. The locked position facilitates reducing the probability of backing out caused by for example vibration in the fluid end 100 during fluid end operations. The reduced probability of the retainer nut 115 backing out facilitates reducing the probability that pressure will build in the bore 110C and cause the fluid end body 105 to prematurely crack. Aspects of the locking assembly 117 facilitate ease of use of the retainer nut assembly 116. For example, an ease of visual reference of the actuator 119 by a user when the retainer nut 115 is installed reduces or eliminates the probability that the user will break or prematurely wear one or more of the actuator 119, the retainer nut 115, the locking tab, and/or the stop 120. Aspects of the locking assembly 117 also facilitate modularity of the retainer nut assembly 116, allowing it to be used on a fluid end 100 with minimal changes to a fluid end body 105. Such benefits promote ease of use, economy of use and reliability of the fluid end 100 and retainer nut assembly 116.

Figure 2C:
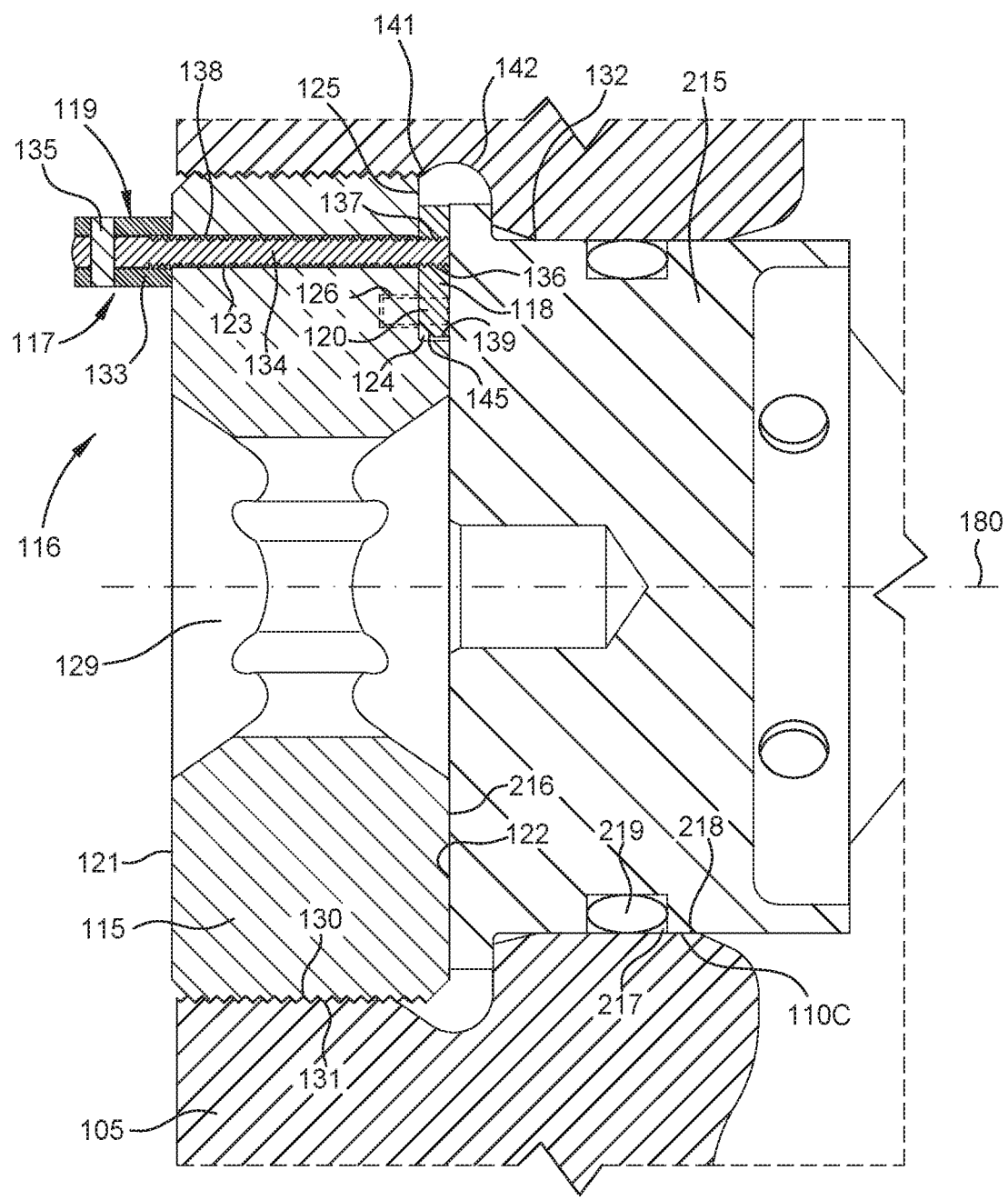
FIG. 2C is a schematic view of the fluid end illustrated in FIG. 2B, according to one implementation.

FIG. 2C is a schematic view of the fluid end 100 illustrated in FIG. 2B, according to one implementation. FIG. 2C illustrates the locking tab 118 of the locking assembly 117 in the unlocked position. The locking tab 118 is in contact with the stop 120 in the unlocked position. The locking tab 118 can be rotated between the locked position illustrated in FIG. 2B and the unlocked position illustrated in FIG. 2C.

Figure 3:
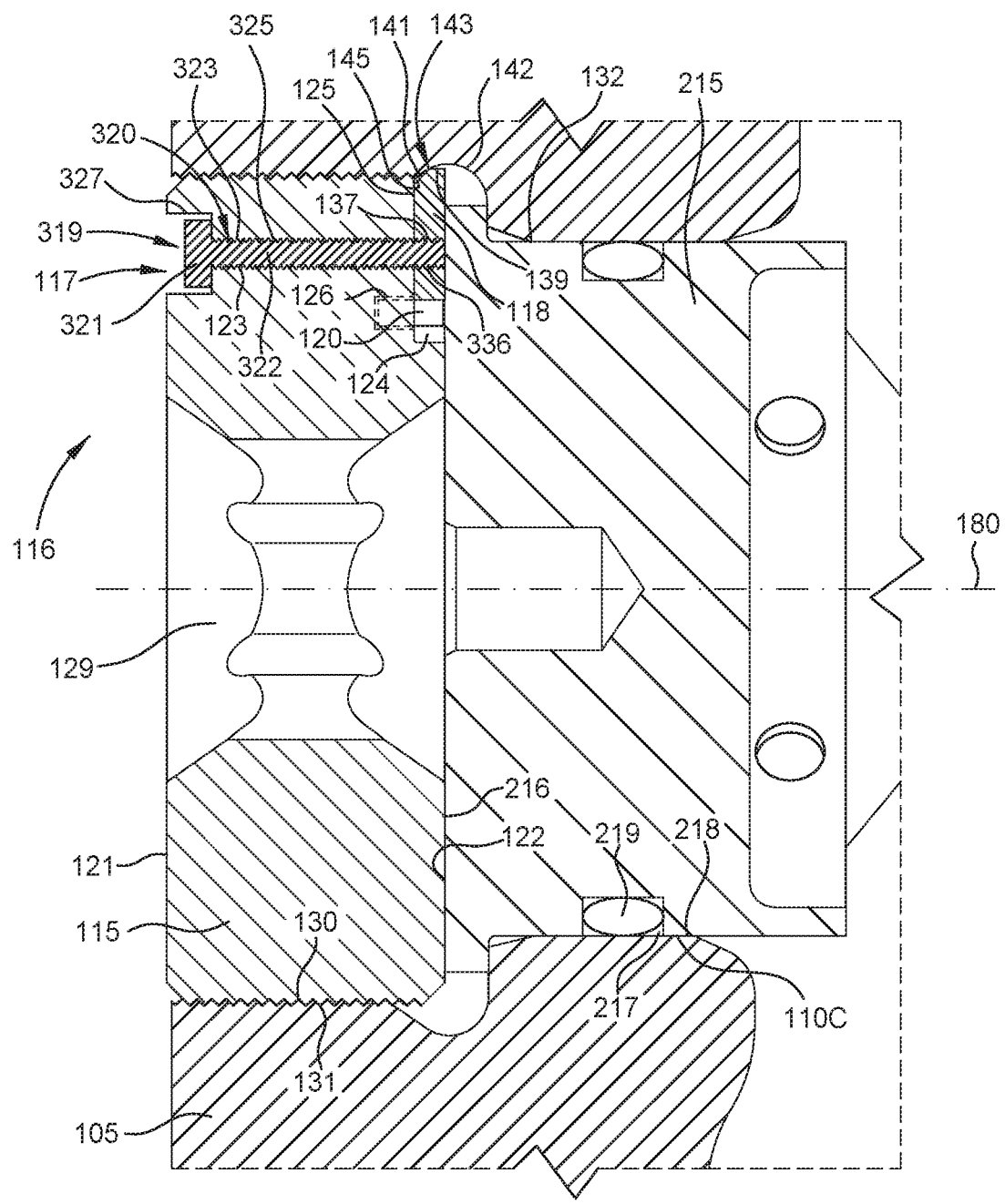
FIG. 3 is a schematic enlarged cross sectional view of the fluid end illustrated in FIGS. 1 and 2A, according to one implementation.

FIG. 3 is a schematic enlarged cross sectional view of the fluid end 100 illustrated in FIGS. 1 and 2A, according to one implementation. The locking assembly 117 includes an actuator 319. FIG. 3 illustrates the locking tab 118 in the locked position. The actuator 319 may include one or more of the aspects, features, properties, and/or components of the actuator 119 described herein. In one example, the actuator 319 includes a screw. In one example, the actuator 319 includes a bolt 320. The bolt 320 includes a head 321, a shank 322, and a threaded portion 323 formed in an outer surface of the shank 322. The threaded portion 323 interfaces with a threaded interior portion 325 of the retainer nut 115. The threaded interior portion 325 is disposed in the first opening 123. The shank 322 connects to the locking tab 118 using a threaded connection 336 between the threaded portion 323 and the threaded portion of the central opening 137 of the locking tab 118. The head 321 is disposed in a recess 327 formed in the first surface 121 of the retainer nut 115. The recess 327 includes a diameter that is larger than a diameter than the first opening 123. The bolt 320 of the actuator 319 can be turned to rotate the locking tab 118 in the locking direction or the unlocking direction, toward the locked position or toward the unlocked position. The head 321 is turned using a tool to rotate the locking tab 118. In one example, a tool such as a wrench is disposed around the head 321 to turn the head 321 in the locking direction or the unlocking direction. In one example, a tool such as a screwdriver is inserted into a slot of the head 321 to turn the head 321.

Figure 4A:
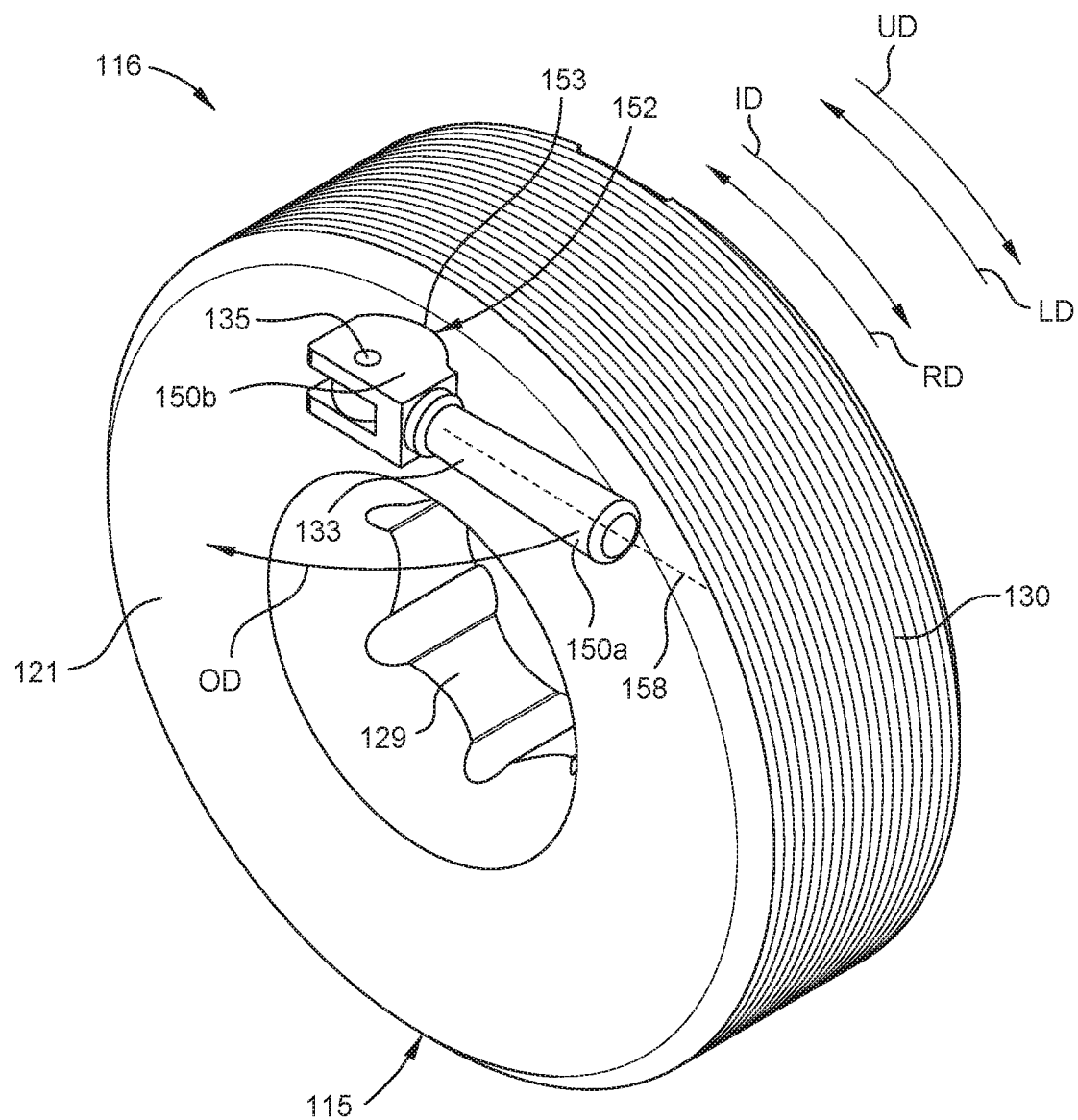
FIGS. 4A and 4B illustrate a schematic isometric front view and a schematic isometric rear view, respectively, of a retainer nut assembly illustrated in FIGS. 1 and 2A-2C, according to one implementation.
Figure 4B:
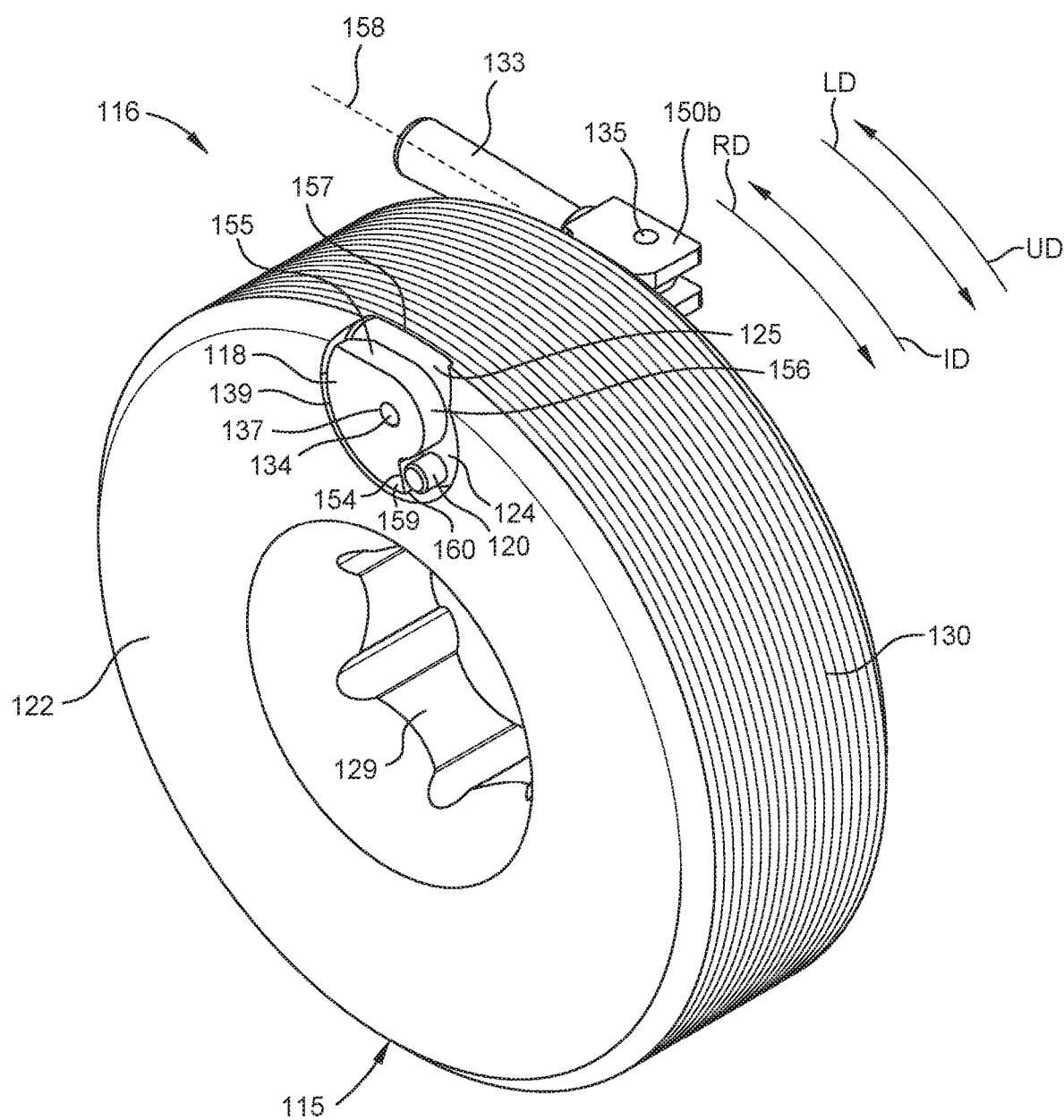

FIGS. 4A and 4B illustrate a schematic isometric front view and a schematic isometric rear view, respectively, of the retainer nut assembly 116 illustrated in FIGS. 1 and 2A-2C, according to one implementation. The retainer nut 115 can be turned in an installation direction ID to rotate the retainer nut 115 and thread the threaded outer surface 130 into the fluid end body 105. The retainer nut 115 may be turned in a removal direction RD to remove the retainer nut from the fluid end body 105. In one example, a tool is used with the inner tool interface 129 to turn the retainer nut 115 in the installation direction ID and/or the removal direction RD. The cam handle 133 includes a first portion 150a and a second portion 150b. The first portion 150a is shaped to be gripped by a user, such as the hand of a user. The second portion 150b includes a frame that connects to the connector rod 134 through the pin 135.

The frame of the second portion 150b of the cam handle 133 includes a curved outer surface 152 that interfaces with the first surface 121 of the retainer nut 115. FIG. 4A illustrates the cam handle 133 in a secured position where an apex 153 of the curved outer surface 152 contacts the first surface 121 to create tension in the connector rod 134. In the secured position, the cam handle 133 cannot be rotated by a user in a locking direction LD or an unlocking direction UD. A user may pull on the first portion 150a of the cam handle 133 and rotate it in an outward direction OD outwardly and away from the first surface 121 of the retainer nut 115, relieving at least some of the tension in the connector rod 134 and rotating the cam handle to an unsecured position. During the movement of the cam handle 133 from the secured position to the unsecured position, the curved outer surface 152 rolls along the first surface 121 and the apex 153 moves out of contact from the first surface 121. The unsecured position of the cam handle 133 allows for the cam handle 133 to be rotated by a user in the locking direction LD or the unlocking direction UD. The rotation of the cam handle 133 facilitates turning of the connector rod 134, which facilitates turning of the locking tab 118 to rotate the locking tab 118 between the locked position and the unlocked position.

In the secured position, a longitudinal axis 158 of the cam handle 133 is parallel to a plane of the first surface 121, within a variance of 30 degrees. In the unsecured position, the longitudinal axis 158 of the cam handle 133 is orthogonal to the plane of the first surface 121, within a variance of 30 degrees.

Figure 4C:
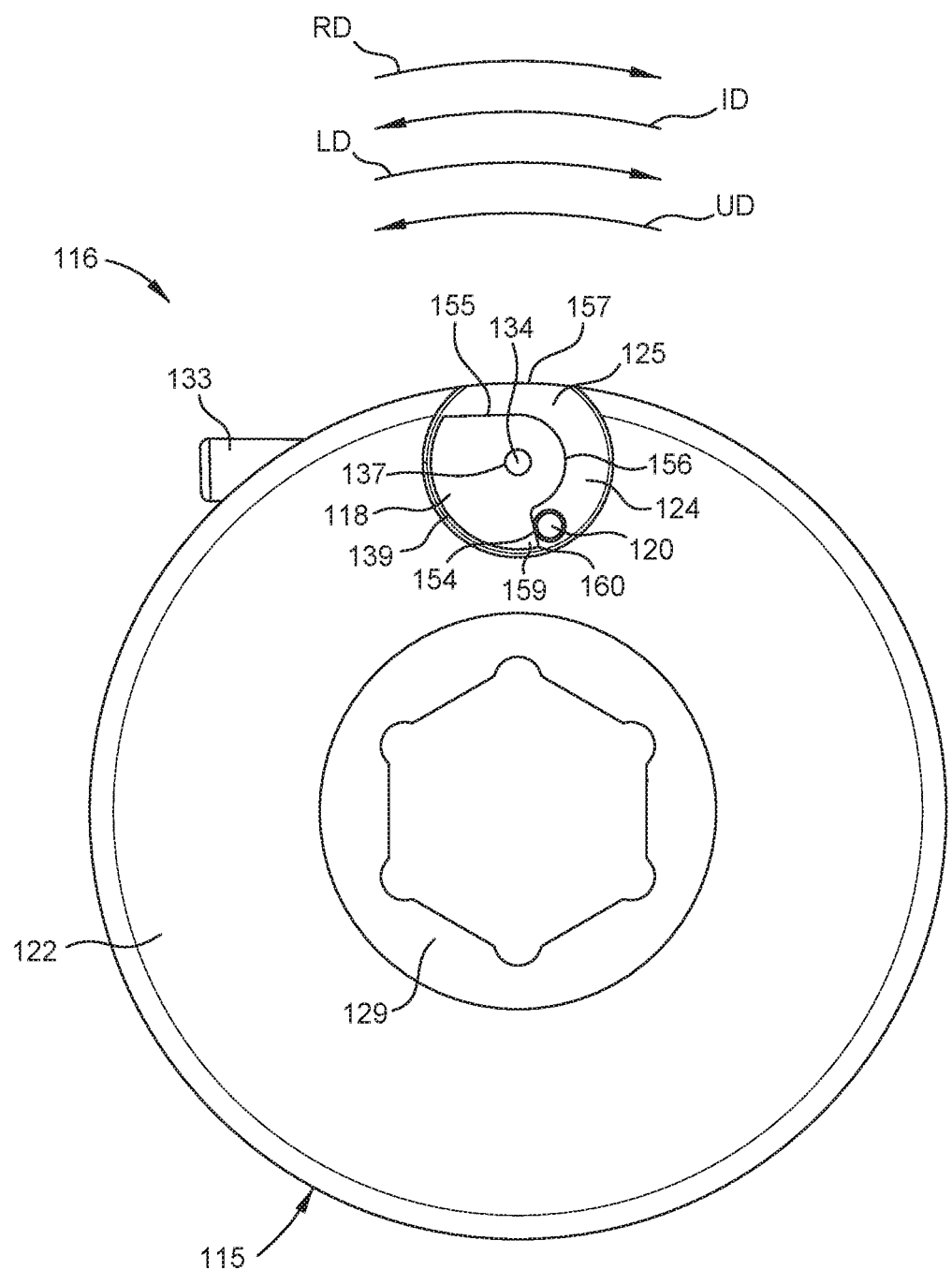
FIG. 4C illustrates a schematic rear view of the retainer nut assembly illustrated in FIGS. 1, 2A-2C, and 4A-4B, according to one implementation.

FIG. 4C illustrates a schematic rear view of the retainer nut assembly 116 illustrated in FIGS. 1, 2A-2C, and 4A-4B, according to one implementation. FIG. 4C illustrates the locking tab 118 in the unlocked position. The locking tab 118 is rotatable between the unlocked position and the locked position, illustrated in FIG. 4D and described below. Referring still to FIG. 4C, the locking tab 118 includes a first planar outer surface 154 and a second planar outer surface 155. The locking tab 118 also includes the first curved outer surface 139 that is disposed between the first planar outer surface 154 and the second planar outer surface 155. The locking tab 118 also includes a second curved outer surface 156 that is disposed between the first planar outer surface 154 and the second planar outer surface 155. The first planar outer surface 154 has a surface area that is smaller than a surface area of the second planar outer surface 155. The first curved outer surface 139 has a surface area that is larger than a surface area of the second curved outer surface 156. The first planar outer surface 154 is disposed at least 90 degrees from the second planar outer surface 155 along the first curved outer surface 139. In the unlocked position of the locking tab 118, the first planar outer surface 154 is in contact with the stop 120. In the unlocked position, each of the first curved outer surface 139, second curved outer surface 156, first planar outer surface 154, and second planar outer surface 155 are disposed in the recess 124 and are within an outer diameter 157 of the retainer nut 115.

Rotating the cam handle 133 relieves at least a part of the tension in the connector rod 134, allowing rotation of the cam handle 133 in the locking direction LD to turn and rotate the locking tab 118 in the locking direction LD from the unlocked position to the locked position. After rotating the locking tab 118 into the locked position, the cam handle 133 can be rotated towards the first surface 121 and back into the secured position. Rotating the cam handle 133 back into the secured position to create tension in the connector rod 134, facilitating keeping the locking tab 118 in the locked position. The locking direction LD is parallel to and in an opposite direction of the installation direction ID. The locking direction LD is parallel to and in the same direction as the removal direction RD.

Figure 4D:
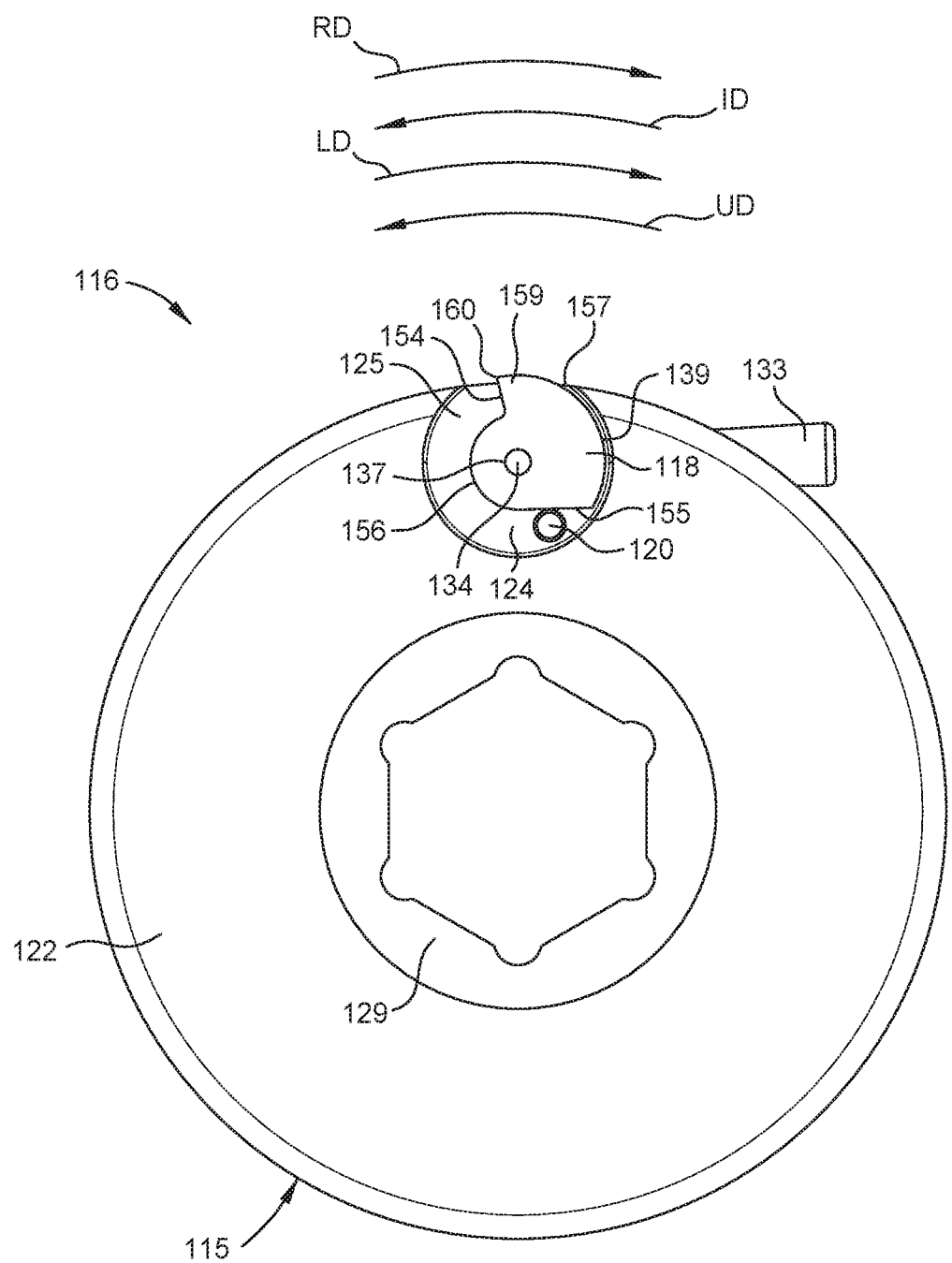
FIG. 4D illustrates a schematic rear view of the retainer nut assembly illustrated in FIGS. 1, 2A-2C, and 4A-4B, according to one implementation.

FIG. 4D illustrates a schematic rear view of the retainer nut assembly 116 illustrated in FIGS. 1, 2A-2C, and 4A-4B, according to one implementation. FIG. 4D illustrates the locking tab 118 in the locked position. In the locked position, the second planar outer surface 155 is in contact with the stop 120. In the locked position, a portion 159 of the locking tab 18 protrudes outside of the outer diameter 157 of the retainer nut 115. In one example, an edge 160 of the locking tab 118 is outside of the outer diameter 157 and outside of the recess 124 when the locking tab 118 is in the locked position. The edge 160 and the portion 159 are within the outer diameter 157 and within the recess 124 when the locking tab 118 is in the unlocked position (as illustrated in FIG. 4C). In one embodiment, which can be combined with other embodiments, one or more of the edge 160 and/or the portion 159 contact the inner surface 132 at the location 143 illustrated in FIG. 2B.

Referring still to FIG. 4D, when the locking tab 118 is in the locked position and the cam handle 133 is in the secured position, the cam handle 133 may be rotated to the unsecured position, relieving at least part of the tension in the connector rod 134. Turning the cam handle 133 in the unlocking direction UD facilitates turning the connector rod 134, which facilitates turning and rotating the locking tab 118 in the unlocking direction UD from the locked position and to the unlocked position. The unlocking direction UD is parallel to and in an opposite direction of the removal direction RD. The unlocking direction UD is parallel to and in the same direction as the installation direction ID. After rotating the locking tab 118 from the locked position and into the unlocked position, the cam handle 133 may be rotated back towards the first surface 121 to facilitate keeping the locking tab 118 in the unlocked position.

Figure 5:
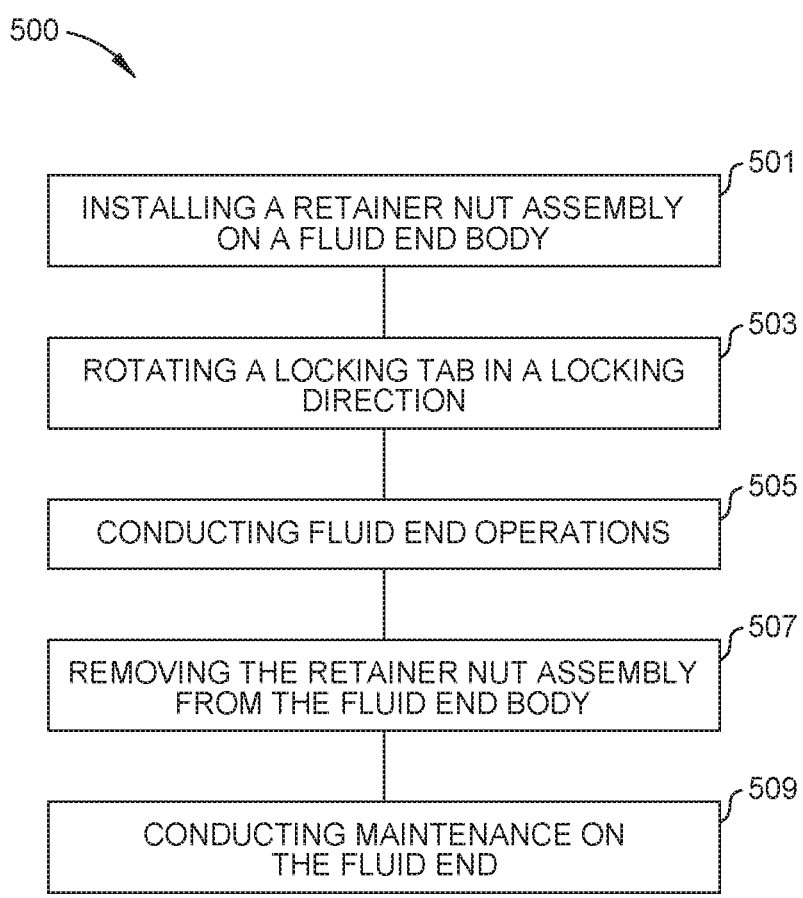
FIG. 5 illustrates a method of operating a fluid end, according to one implementation.

FIG. 5 illustrates a method 500 of operating a fluid end, according to one implementation. In one embodiment, which can be combined with other embodiments, the method 500 is a method of operating the fluid end 100. At block 501, a retainer nut assembly 116 is installed on a fluid end body 105 by turning a retainer nut 115 in an installation direction ID and into a bore 110C formed in the fluid end body 105. At block 501, a threaded outer surface 130 of the retainer nut 115 is threaded into a threaded portion 131 of an inner surface 132 of the fluid end body 105. At block 503, a locking tab 118 is rotated in a locking direction LD and into contact with the inner surface 132 of the fluid end body 105. The rotating the locking tab 118 at block 503 includes rotating the locking tab 118 from an unlocked position to a locked position. The rotating the locking tab 118 at block 503 includes rotating the locking tab 118 from out of contact with the stop 120 on one side and into contact with the stop 120 on another side.

In one example, the rotating the locking tab 118 at block 503 includes turning a head 321 of a bolt 320 in the locking direction LD. In one example, the rotating the locking tab 118 at block 503 includes turning a cam handle 133 in the locking direction LD. In one example, the rotating the locking tab 118 at block 503 includes rotating the cam handle 133 outwardly and away from a first surface 121 of the retainer nut 115 prior to turning the cam handle 133 in the locking direction LD. In one example, the rotating the locking tab 118 at block 503 includes rotating the cam handle 133 inwardly and toward the first surface 121 of the retainer nut 115 subsequent to turning the cam handle 133 in the locking direction LD.

At block 505, fluid end operations are conducted, such as oil and gas operations. In one example, the fluid end 100 is used to pump frac fluids downhole and into an oil and gas wellbore.

At block 507, the retainer nut assembly 116 is removed from the fluid end body 105. The removing the retainer nut assembly at block 507 includes rotating the locking tab 118 in an unlocking direction UD from the locked position to an unlocked position.

In one example, the rotating the locking tab 118 at block 507 includes turning a head 321 of a bolt 320 in the unlocking direction UD. In one example, the rotating the locking tab 118 at block 507 includes turning the cam handle 133 in the unlocking direction UD. In one example, the rotating the locking tab 118 at block 507 includes rotating the cam handle 133 outwardly and away from the first surface 121 of the retainer nut 115 prior to turning the cam handle 133 in the unlocking direction UD. In one example, the rotating the locking tab 118 at block 507 includes rotating the cam handle 133 inwardly and toward the first surface 121 of the retainer nut 115 subsequent to turning the cam handle 133 in the unlocking direction UD.

At block 509, maintenance is conducted on the fluid end 100. In one example, the conducting of maintenance at block 509 includes removing a plunger 200 from the fluid end body 105 through the bore 110C.

Benefits of the present disclosure include reduced or eliminated probability of premature failure of fluid ends; reduced or eliminated probability of backing out of retainer nuts; ease of use of fluid ends and retainer nut assemblies, ease of visual reference of locking components; reduced or eliminated probability of users breaking locking components; promoted modularity of retainer nut assemblies with fluid ends; reduced or eliminated changes to fluid ends; ease of use of fluid ends and retainer nut assemblies; low costs for fluid ends and retainer nut assemblies; and promoted reliability fluid ends and retainer nut assemblies.

Aspects of the present disclosure include a locking tab rotatable between a locked position and an unlocked position, a portion of the locking tab that protrudes outside of an outer diameter of a retainer nut, an actuator, a stop, a cam handle, a connector rod, a bolt having a head, and a method of operating a fluid end. It is contemplated that one or more of these aspects disclosed herein may be combined. Moreover, it is contemplated that one or more of these aspects may include some or all of the aforementioned benefits.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

I claim:

1. A retainer nut assembly for fluid ends, comprising:
    a retainer nut, the retainer nut comprising:
        a first surface at a first end of the retainer nut;
        a second surface at a second end of the retainer nut;
        a recess formed in the second surface that defines a recessed surface;
        a first opening extending from the first surface to the recessed surface;
        a second opening formed in the recessed surface; and
        a threaded outer surface disposed between the first surface and the
    second surface; and a locking assembly, comprising:
a locking tab;
a stop disposed at least partially in the second opening and protruding from the recessed surface; and
an actuator disposed at least partially in the first opening that is configured to rotate the locking tab between an unlocked position and a locked position.

2. The retainer nut assembly of claim 1, wherein the actuator connects to the locking tab through the first opening that extends from the first surface to the recessed surface of the retainer nut, and the locking tab comprises a central opening that receives a portion of the actuator.

3. The retainer nut assembly of claim 2, wherein the actuator further comprises a cam handle and a connector rod that connects the cam handle to the locking tab, the connector rod being disposed at least partially in the first opening that extends from the first surface to the recessed surface of the retainer nut.

4. The retainer nut assembly of claim 2, wherein the actuator comprises a bolt, the bolt comprising a head, a shank, and a threaded portion.

5. The retainer nut assembly of claim 2, wherein:
the locking tab comprises a first planar outer surface, a second planar outer surface, a first curved outer surface disposed between the first planar outer surface and the second planar outer surface, and a second curved outer surface disposed between the first planar outer surface and the second planar outer surface;
the first planar outer surface of the locking tab is in contact with the stop in the unlocked position; and
the second planar outer surface of the locking tab is in contact with the stop in the locked position.

6. The retainer nut assembly of claim 5, wherein the first planar outer surface has a surface area that is smaller than a surface area of the second planar outer surface, and the first curved outer surface has a surface area that is larger than a surface area of the second curved outer surface.

7. The retainer nut assembly of claim 6, wherein the first planar outer surface is disposed from the second planar outer surface by at least 90 degrees along the first curved outer surface.

8. The retainer nut assembly of claim 7, wherein, in the locked position, a portion of the locking tab protrudes outside of an outer diameter of the retainer nut.

9. The retainer nut assembly of claim 8, wherein, in the locked position, an edge of the locking tab is outside of the outer diameter of the retainer nut.

10. The retainer nut assembly of claim 8, wherein, in the unlocked position, the portion of the locking tab is within the outer diameter of the retainer nut.

11. A method of operating a fluid end, comprising:
installing a retainer nut assembly on a fluid end body by turning a retainer nut having a threaded outer surface in an installation direction and into a bore formed in the fluid end body, the retainer nut comprising:
a first surface at a first end of the retainer nut that faces away from the fluid end body,
a second surface at a second end of the retainer nut that faces the fluid end body, the threaded outer surface disposed between the first surface and the second surface
a recess formed in the second surface that defines a recessed surface,
a first opening extending from the first surface to the recessed surface,
a second opening formed in the recessed surface; and
turning an actuator disposed at least partially in the first opening to rotate a locking tab of a locking assembly from out of contact with a stop of the locking assembly in a locking direction and into contact with an inner surface of the fluid end body, the locking direction being opposite of the installation direction, the stop disposed at least partially in the second opening and protruding from the recessed surface, the actuator configured to rotate the locking tab between an unlocked position and a locked position, and the locking tab disposed inside the bore and adjacent to the second surface of the retainer nut.

12. The method of claim 11, wherein the turning the actuator to rotate the locking tab comprises:
rotating the locking tab from the unlocked position to the locked position; and
rotating the locking tab from out of contact with the stop and into contact with the stop.

13. The method of claim 11, wherein the turning the actuator to rotate the locking tab comprises turning a head of a bolt that is connected to the locking tab through the first opening.

14. The method of claim 11, wherein the turning the actuator to rotate the locking tab comprises turning a cam handle in the locking direction, the cam handle connected to the locking tab through a connector rod disposed at least partially in the first opening.

15. A fluid end, comprising:
a fluid end body;
a plunger disposed at least partially in the fluid end body;
a bore defining an inner surface of the fluid end body, the inner surface comprising a threaded portion and a thread relief disposed inward of the threaded portion; and
a retainer nut assembly, the retainer nut assembly comprising:
a retainer nut disposed at least partially in the bore, the retainer nut comprising:
a first surface at a first end of the retainer nut,
a second surface at a second end of the retainer nut,
a recess formed in the second surface that defines a recessed surface,
a first opening extending from the first surface to the recessed surface,
a second opening formed in the recessed surface, and
a threaded outer surface that interfaces with the threaded portion of the inner surface of the fluid end body, the threaded outer surface disposed between the first surface and the second surface; and
a locking assembly, the locking assembly comprising:
a locking tab that is rotatable between an unlocked position and a locked position, and in the locked position the locking tab contacts the inner surface of the fluid end body at a location inwards of or at the thread relief,
a stop disposed at least partially in the second opening and protruding from the recessed surface, and
an actuator disposed at least partially in the first opening that is configured to rotate the locking tab between the unlocked position and the locked position.

16. The fluid end of claim 15, further comprising a suction cover disposed inwards of the retainer nut, wherein a surface of the retainer nut is in contact with the suction cover.

17. The fluid end of claim 15, wherein the actuator connects to the locking tab through the first opening.

18. The fluid end of claim 17, wherein the actuator further comprises a cam handle and a connector rod that connects the cam handle to the locking tab, the connector rod being disposed at least partially in the first opening.

19. The fluid end of claim 17, wherein the actuator comprises a bolt, the bolt comprising a head, a shank, and a threaded portion.

20. The fluid end of claim 15, wherein the locking tab is rotatable from the unlocked position to the locked position in a locking direction that is opposite of an installation direction defined by a direction that the retainer nut is threaded into the fluid end body.

\* \* \* \* \*